United States Patent
Bombacino et al.

(10) Patent No.: US 10,515,320 B2
(45) Date of Patent: Dec. 24, 2019

(54) BIOMETRIC VERIFICATION OF TICKET USERS

(71) Applicant: International Business Machines Corporation, Armonk, NY (US)

(72) Inventors: Vinicio Bombacino, Rome (IT); Sergio Pagano, Rome (IT); Gianluca Perreca, Rome (IT); Andrea Tortosa, Rome (IT)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 15/270,765

(22) Filed: Sep. 20, 2016

(65) Prior Publication Data

US 2018/0082220 A1 Mar. 22, 2018

(51) Int. Cl.
  *G06Q 10/02* (2012.01)
  *H04L 29/06* (2006.01)
  *G06Q 30/00* (2012.01)
  *H04W 12/06* (2009.01)

(52) U.S. Cl.
  CPC ......... *G06Q 10/02* (2013.01); *G06Q 30/0185* (2013.01); *H04L 63/0861* (2013.01); *H04W 12/06* (2013.01)

(58) Field of Classification Search
  None
  See application file for complete search history.

(56) References Cited

U.S. PATENT DOCUMENTS

| | | | | |
|---|---|---|---|---|
| 7,007,106 B1* | 2/2006 | Flood | ............ | H04J 3/0655 370/503 |
| 7,031,391 B1* | 4/2006 | Riffee | ............ | H04N 7/52 375/240.27 |
| 7,086,082 B1* | 8/2006 | Kokkinen | ............ | H04J 3/1647 348/E7.07 |
| 7,142,515 B2* | 11/2006 | Benayoun | ............ | H04L 49/1507 370/235 |
| 8,103,881 B2 | 1/2012 | Doughty et al. | | |

(Continued)

FOREIGN PATENT DOCUMENTS

EP    2759970 A1    7/2014

OTHER PUBLICATIONS

L. Finžgar, M. Trebar, "Use of NFC and QR Code Identification in an Electronic Ticket System for Public Transport," Software, Télécommunications and Computer Networks (SoftCOM), 2011 19th International Conference, Date of conference : Sep. 15-17, 2011, pp. 1-6.

*Primary Examiner* — Tonya Joseph
(74) *Attorney, Agent, or Firm* — Patterson + Sheridan, LLP

(57) ABSTRACT

Techniques are disclosed for validating a ticket based on biometric data provided by a ticket holding user. A ticket controller device broadcasts an inquiry frame specifying a request for authentication data for a ticket user requesting access to a service hosted by the ticket controller. A mobile device may receive the inquiry frame and generate a response frame encapsulating a ticket identifier and biometric data associated with a user. The ticket controller receives the response frame including the ticket identifier and the biometric data. Upon determining that the ticket identifier and the biometric data encapsulated in the response frame matches a stored ticket identifier and biometric data, the ticket controller grants the user access to the service.

3 Claims, 8 Drawing Sheets

(56) References Cited

U.S. PATENT DOCUMENTS

| | | | |
|---|---|---|---|
| 10,070,418 B2* | 9/2018 | Liu | H04L 5/0023 |
| 2001/0018660 A1* | 8/2001 | Sehr | G06Q 10/02 |
| | | | 705/5 |
| 2007/0245351 A1* | 10/2007 | Sussman | G06F 9/50 |
| | | | 718/104 |
| 2007/0276944 A1* | 11/2007 | Samovar | G07C 9/00103 |
| | | | 709/225 |
| 2008/0101400 A1* | 5/2008 | Auterinen | H04L 12/66 |
| | | | 370/463 |
| 2013/0159026 A1 | 6/2013 | Rogel et al. | |
| 2013/0326614 A1* | 12/2013 | Truskovsky | G06F 21/44 |
| | | | 726/19 |
| 2014/0062657 A1* | 3/2014 | Adachi | G07C 9/00007 |
| | | | 340/5.64 |
| 2015/0014412 A1 | 1/2015 | Sulavik et al. | |
| 2015/0035644 A1 | 2/2015 | June et al. | |
| 2015/0208309 A1* | 7/2015 | Taneja | H04W 36/0066 |
| | | | 455/426.1 |
| 2017/0367016 A1* | 12/2017 | Taneja | H04W 36/0066 |
| 2018/0082220 A1* | 3/2018 | Bombacino | G06Q 10/02 |

* cited by examiner

BIOMETRIC VERIFICATION OF TICKET USERS

BACKGROUND

Field

The present invention relates to physical access control, and more specifically, to verifying a ticket of a user from the biometric data of the user.

Description of Related Art

Tickets for mass transportation, musical venues, sporting events, etc. are generally intended for personal usage and are intended to be non-transferable. For example, a day pass for a public transit system may be issued with the expectation that a single person uses it a few times in a day. If multiple people were to share it, then the cost of honoring the pass would be far above expectations for a single person. To avoid this problem, the transit authorities need a way to check that the person using the ticket is the one who it was issued to.

One existing solution to this problem is to print a picture of the authorized user on the ticket. However, a drawback to this approach is that printing the tickets as a result becomes expensive, e.g., for a single-day ticket. Further, verifying users can become a slow and error-prone process.

Another existing solution is to issue a special electronic device to each authorized user. This device stores the ticket information and biometric data for an authorized user. At usage time, the device obtains actual biometric data from the user, compares the actual biometric data to the stored biometric data, and notifies the central system whether the user is authorized. However, this solution requires mass-manufacture and distribution of single-purpose devices to each user, which can become prohibitively expensive.

As the foregoing illustrates, what is needed in the art is an accurate, scalable, and inexpensive way to verify that people only use tickets that have been assigned to them.

SUMMARY

One embodiment presented herein discloses a method. The method generally includes broadcasting, by a ticket controller, a first frame. The first frame specifies a request for authentication data for a ticket user requesting access to a service hosted by the ticket controller. The ticket controller receives a second frame sent in response to the first frame. The second frame includes a first ticket identifier and first biometric data associated with the ticket user. Upon determining that the first ticket identifier and the first biometric data matches a corresponding second ticket identifier and a second biometric data, the ticket user is granted access to the service. The second ticket identifier and second biometric data are of a plurality of stored ticket identifiers and biometric data.

Another embodiment presented herein discloses a computer program product. The computer program product includes a computer-readable storage medium storing instructions, which, when executed on a processor, performs an operation for validating a ticket. The operation itself generally includes broadcasting, by a ticket controller, a first frame. The first frame specifies a request for authentication data for a ticket user requesting access to a service hosted by the ticket controller. The ticket controller receives a second frame sent in response to the first frame. The second frame includes a first ticket identifier and first biometric data associated with the ticket user. Upon determining that the first ticket identifier and the first biometric data matches a corresponding second ticket identifier and a second biometric data, the ticket user is granted access to the service. The second ticket identifier and second biometric data are of a plurality of stored ticket identifiers and biometric data.

Yet another embodiment presented herein discloses a system having a processor and a memory. The memory stores program code, which, when executed on a processor, performs an operation for validating a ticket. The operation itself generally includes broadcasting, by a ticket controller, a first frame. The first frame specifies a request for authentication data for a ticket user requesting access to a service hosted by the ticket controller. The ticket controller receives a second frame sent in response to the first frame. The second frame includes a first ticket identifier and first biometric data associated with the ticket user. Upon determining that the first ticket identifier and the first biometric data matches a corresponding second ticket identifier and a second biometric data, the ticket user is granted access to the service. The second ticket identifier and second biometric data are of a plurality of stored ticket identifiers and biometric data.

DETAILED DESCRIPTION

Figure 1:
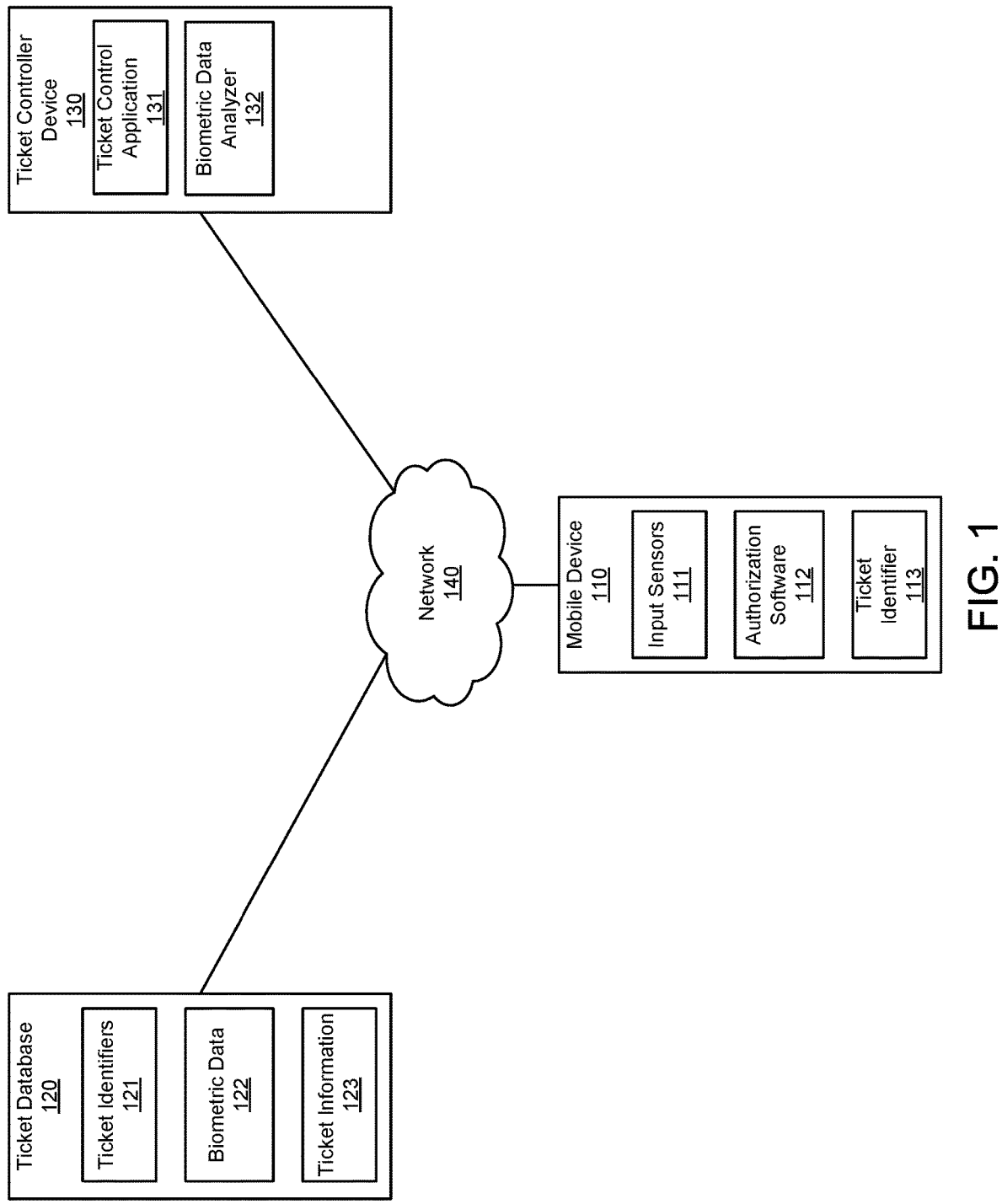
FIG. 1 illustrates an example computing environment, according to one embodiment.

Embodiments presented herein provide methods for the verifying biometric data of a user of a ticketing system. In one embodiment, a user, e.g., a ticket holder, submits a ticket to a ticket controller device, e.g., to obtain access to a service, such as to public infrastructure (e.g., a public transport such as a bus or train). In turn, the ticket controller device transmits a broadcast inquiry frame which can be received by a mobile device (e.g., a smartphone, tablet, or smartwatch) of the user. Typically, a broadcast frame (e.g., in frames generated under the 802.11 standard) includes one or more unused address fields. In one embodiment, the ticket controller may include, in an unused address field, a type value that specifies to receiving devices that the frame is an inquiry frame—thus allowing the receiving device to recognize the frame as such.

Once received, the mobile device identifies, based on the type value, that the frame is of a broadcast inquiry type. The mobile device then generates broadcast response frame. Further, the mobile device generates authentication data and encapsulates the authentication data into the broadcast response frame. For example, authentication data may include biometric data as well as a distinct ticket identifier associated with the user at the time of registration of the ticket. Biometric data may include unique biometrics obtained from user on the mobile device, e.g., by scanning a fingerprint of the user, recording a voice of the user, or capturing a facial image of the user. Such biometric data may correspond to data provided to the user at the time of registration of the ticket.

In turn, the ticket controller device accesses a list indicating authorized ticket identifiers, e.g., stored in a database. Further, the list of ticket identifiers may be associated with the biometric data corresponding to the user. The ticket controller may then determine whether the ticket identifier and biometric data included in the response frame match a ticket identifier and biometric data included in the list. In case of a match, the ticket controller device authorizes the user for access to the desired public infrastructure service.

Further, in one embodiment, at registration time for a ticket to a user, the ticket controller may also associate a ticket with a limited period of time in which the user may access the public infrastructure. The validity period may be a preset value, or it may be specified by the user or assigned by some other means. Further still, the ticket controller may also invalidate a ticket after a specified number of uses. In such a case, the ticket controller device removes the underlying ticket identifier from the list of ticket identifiers. As another example, the ticket controller device can decrement a remaining number of uses associated with a given ticket identifier. This approach allows a transit system to issue a single use pass or a pass with some greater but specified number of uses, e.g., ten uses.

In another embodiment, the inquiry response takes the form of a standard IEEE 802.11 frame. This approach may take advantage the one of the unused address fields in the IEEE 802.11 standard frame header by specifying the ticket identifier in an unused "Address 3" field. The IEEE 802.11 frame data field would specify the biometric data of the user.

Further, the inquiry response may use another communications protocol. For example, the inquiry response may be a Bluetooth (IEEE 802.15.4) frame, or the inquiry response may be communicated via near-field communications. Further still, the inquiry response could be communicated optically, such as via a QR code.

In one embodiment, the ticket controller is part of a distributed system. For example, the system may include one or more centralized databases or servers which would perform any storage or match determination functions. This approach may further include localized terminals at each location of use, e.g., at train stations or bus stops, or even on individual trains or busses. The localized terminals may perform the communications with the mobile device, such as sending the broadcast inquiry, or receiving the response to the broadcast inquiry.

In another embodiment, the mobile device may preprocess user biometric data prior to responding to the broadcast inquiry. For example, this may include encrypting or compressing the user biometric data or reducing the biometric data to a set of identifying features or parameters.

Another embodiment may include additional steps or components. For example, a user may purchase a ticket via a mobile device or public kiosk. At purchase time, the mobile device or public kiosk may capture biometric data from the user and send the biometric data to the ticket controller. Doing so allows the ticket controller to preprocess the biometric data and associate the biometric data with a ticket identifier of the user. Further, the user may provide additional ticket information as part of the purchase, such as a validity period, a specific validity location, or other information. Some of this information may default to a preset value, if not provided by the user. The ticket controller assigns a ticket identifier to the user and provides the ticket identifier to the user or to the mobile device. The ticket identifier could be provided electronically or on a physical medium such as a printed paper ticket, wrist-band, token, memory card, or other means. The ticket controller also sends the ticket identifier and biometric data of the user to a ticket database to be correlated and stored. Further, the ticket controller may correlate additional ticket information with the ticket identifier and store the additional ticket information in the ticket database.

Advantageously, embodiments presented herein provide an approach for authenticating a ticket holder using biometric data that can be obtained by a variety of mobile devices, such as smartphones, tablets, or smart watches. Additionally, by using a broadcast-type frame for inquiries, the ticket controller device may interact with multiple users at a time. As a result, this approach may be performed rapidly and on a large scale. Further, this approach allows a relative amount of accuracy in validating that a ticket to a given user.

Note, the following uses a ticketing system for public transit as a reference example for verifying ticket ownership by a user. However, one of skill in the art will understand that embodiments presented herein may be adapted to a variety of ticketing environments. For example, other use cases may include access to musical or sporting events, fitness or recreational facilities, or entertainment venues. In a musical or sporting event use case, an event manager may wish to prevent ticket scalping. As another example, a sports team may wish to issue season tickets limited to use by the purchaser. Further, in a fitness or recreational facility use case, a gym owner may wish to prevent multiple people from sharing a single membership. Embodiments presented herein could be adapted to each of the above use cases.

FIG. 1 illustrates an example computing environment, according to one embodiment. As shown, the computing environment includes a mobile device 110, a ticket database 120, a ticket controller 130, each interconnected via a network 140 (e.g., the Internet).

In one embodiment, the mobile device 110 includes one or more input sensors 111, authorization software 112, and a ticket identifier 113. In one embodiment, the mobile device 110 corresponds to a device of a user that owns a ticket for accessing a public infrastructure (e.g., a public transport such as a bus or a train). For example, the user may register in advance to obtain the ticket using biometric data, captured by the input sensors 111, of the user. To do so, the ticket authorization software 112 communicates with the input sensors 111 and obtains biometric data. Biometric data may include a fingerprint scan, a voice recording, or a facial image. In one embodiment, the mobile device 110 can be a smartphone, a wearable device, a tablet device, and the like.

In one embodiment, the ticket database 120 is a database server storing data relating to tickets maintained by the public infrastructure. Illustratively, the ticket database 120 stores ticket identifiers 121, biometric data 122, and ticket information 123. For example, a given ticket may include a unique ticket identifier 121 associated with the ticket. Further, the ticket identifier 121 is associated with biometric data 122 of the user, captured by the mobile device 110. Further still, the ticket database may include additional ticket information 123 associated with the ticket, such as a specification of a period during which the ticket is valid and locations at which the ticket is valid.

As shown, the ticket controller device 130 includes a ticket control application 131 and a biometric data analyzer 132. In one embodiment, the ticket control application 131 may register ticket information (e.g., a ticket identifier, biometric data, and other information) for a user obtaining a ticket. Further, the ticket control application 131 may also obtain such information from a user (via the mobile device 110) and transfer the information to the ticket database 120, e.g., via a service operating the database. In one embodiment, the ticket controller device 130 may be a physical computing system, e.g., located at a kiosk associated with the public infrastructure, e.g., a bus station, train station, etc.

In one embodiment, the ticket control application 131 is configured to authorize a user obtaining access to the public infrastructure. For example, the user may attempt to scan a ticket at the ticket controller device 130. In response, the ticket control software 131 may generate a broadcast frame that is readable by the mobile device 110, e.g., on authorization software 112 executing on the mobile device 110. In one embodiment, the broadcast frame generated by the ticket control application 131 may include, in typically unused address fields, a type value indicating that the type of the broadcast frame is an inquiry frame—a frame request a response for information from a receiving device. A receiving device may obtain the broadcast inquiry frame and send a response frame including the information.

For instance, the response frame may include a ticket identifier and biometric data associated with a given ticket. Once received, the ticket control application 131 determines whether a matching ticket identifier 121 and associated biometric data 122 is stored in the ticket database 120. For example, to match the biometric data, a biometric data analyzer 132 executing in the ticket controller device 130 may use various techniques. For instance, given fingerprint data, the biometric data analyzer 132 may evaluate patterns of the biometric data 122 against the biometric data provided in the response frame.

A match to a ticket identifier 121 and biometric data 122 indicates that a corresponding ticket is stored in the ticket database 120. In case of a match, the ticket control application 131 may retrieve the additional ticket information 123 to determine the validity of the ticket, e.g., whether the ticket is used within a specified time period, whether the ticket is used at a valid location, etc. Once so determined, the ticket control application 131 may authorize access to the user for the public infrastructure. Otherwise, the ticket control application 131 may reject the user and perform some other action, e.g., directing the mobile device 110 to display an authorization prompt, issuing a toll to the user at the ticket controller device 130, etc.

Figure 2:
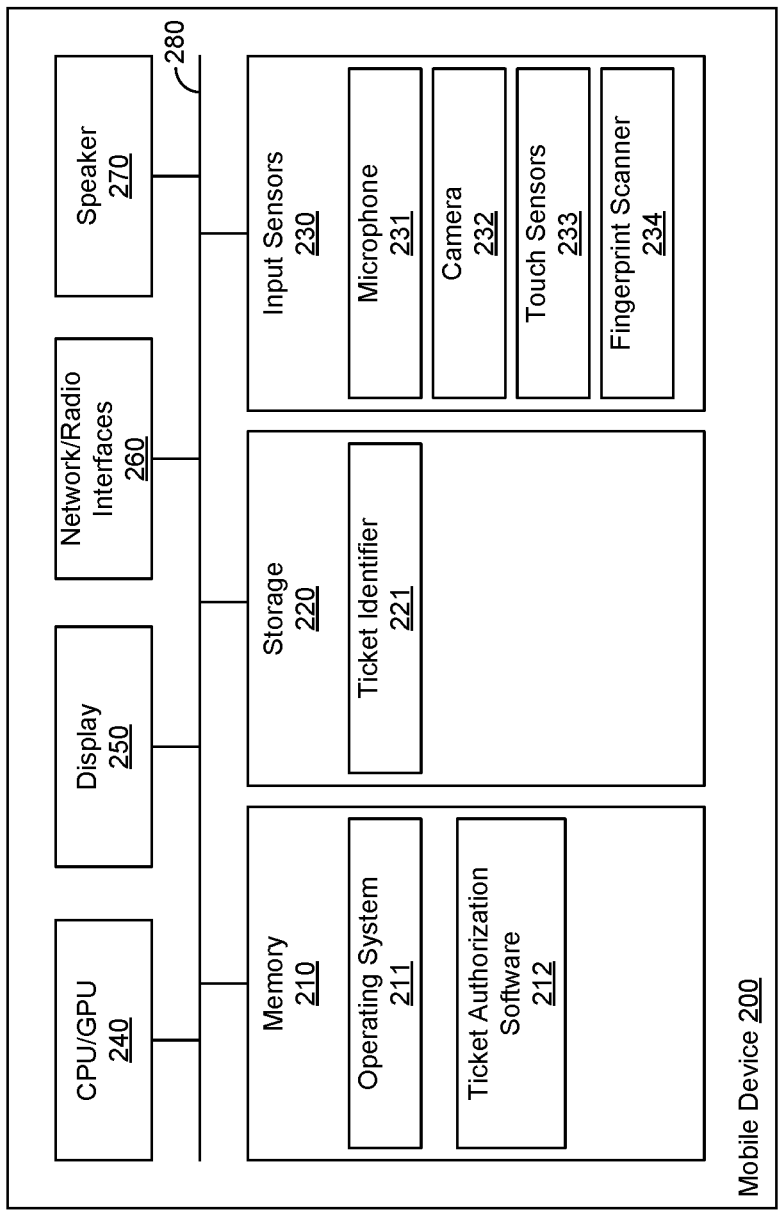
FIG. 2 illustrates an example mobile device, according to one embodiment.

FIG. 2 illustrates an example mobile device 200, according to one embodiment. Among other possibilities, the mobile device 200 may be a commercially available smartphone, tablet, or smartwatch. As shown, the mobile device 200 includes, without limitation, memory 210, a storage 220, input sensors 230, a central processing unit and graphics processing unit (CPU/GPU) 240, a display 250, network/radio interfaces 260, a speaker 270, and an interconnect 280. Of course, an actual mobile device will include a variety of additional hardware components.

The CPU/GPU 240 retrieves and executes programming instructions stored in the memory 210. Similarly, the CPU/GPU 240 stores and retrieves application data residing in the memory 210. The interconnect 280 is used to transmit instructions and data between the memory 210, storage 220, input sensors 230, CPU/GPU 240, display 250, network/radio interfaces 260, and speaker 270. CPU/GPU 240 is included to be representative of a single CPU, multiple CPUs, a single CPU having multiple processing cores, and the like. And the memory 210 is generally included to be representative of memory and storage on a mobile device, e.g., DDR and flash memory spaces.

Illustratively, the memory 210 includes an operating system 211, and ticket authorization software 212. The storage 220 may include a ticket identifier 221 assigned to the user as part of the ticket purchasing process. The operating system 211 provides software configured to control the execution of application programs on the mobile device 200. The ticket authorization software 212 is configured to control the performance of tasks by the mobile device 200 related to the biometric verification of ticket users. For example, the ticket authorization software 212 may receive a broadcast frame sent by the ticket controller device 130. The ticket authorization software 212 may evaluate a type field of the broadcast frame to determine whether the frame corresponds to an inquiry frame. Once so determined, the ticket authorization software 212 generates a broadcast response frame formatted to be readable by the ticket controller device 130. Such a frame may encapsulate biometric data and a ticket identifier associated with a ticket of the user. In one embodiment, the mobile device 200 provides input sensors 230 for collecting biometric data of a given user. Illustratively, the input sensors 230 may include a microphone 231, a camera 232, touch sensors 233, or a fingerprint scanner 234. The input sensors 230 may be used to capture biometric data, such as a voice recording, a facial image, a signature, or a fingerprint scan.

The network/radio interfaces 260 may include a cellular modem, an IEEE 802.11 interface, a Bluetooth interface, a near-field communications interface, or other means of communication. The network/radio interfaces 260 allow the mobile device 200 to wirelessly communicate with the ticket controller device 130.

Figure 3:
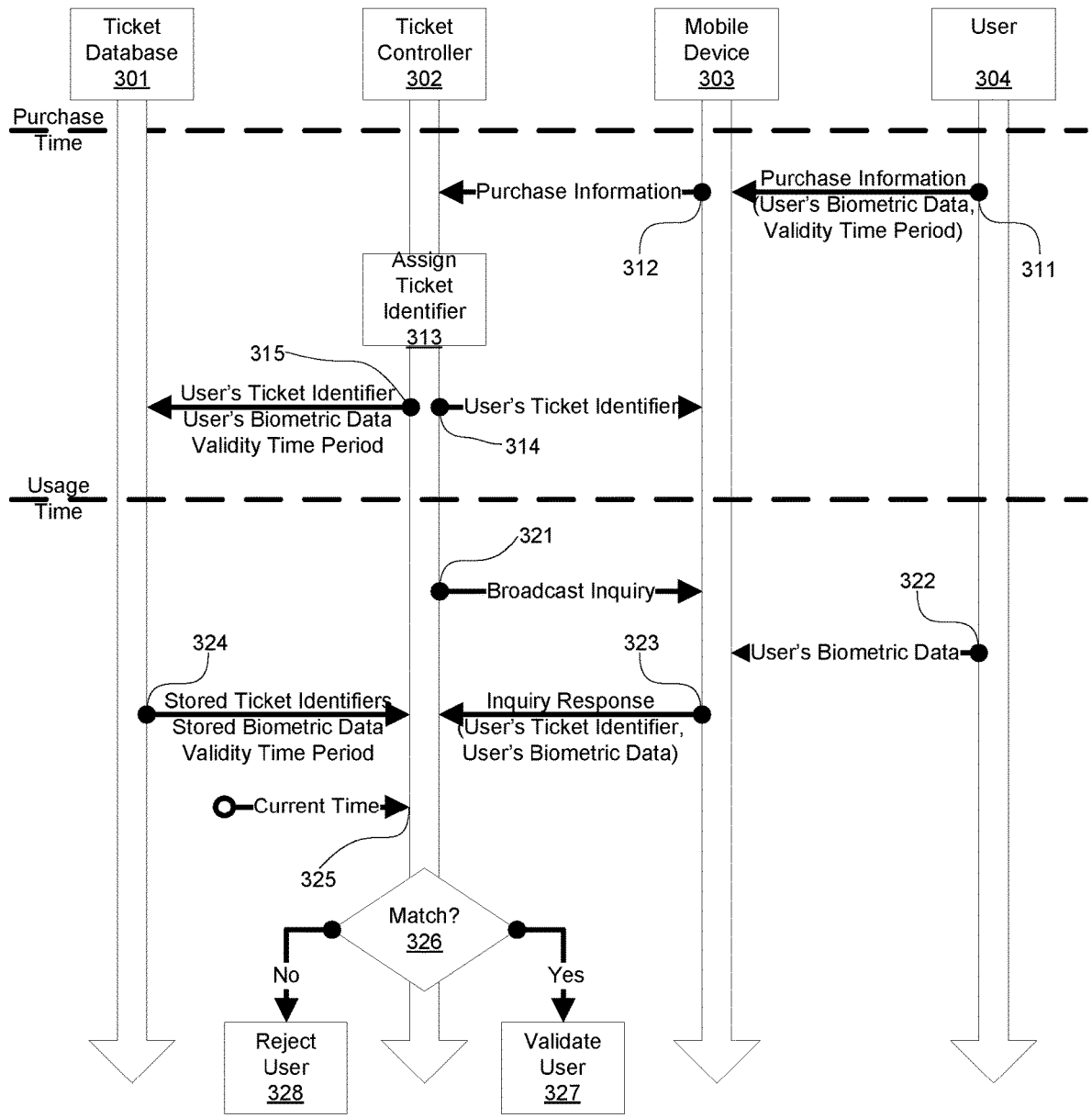
FIG. 3 illustrates a sequence for verifying biometric data associated with a ticket user, according to one embodiment.

FIG. 3 illustrates an example sequence of biometric verification of ticket users, according to one embodiment. As shown, the sequence includes a ticket database 301, a ticket controller 302, a mobile device 303, and a user 304.

In this example, at purchase time 310, the mobile device 303 obtains purchase information from the user 304 (at 311). This purchase information includes a user's biometric data, and may include a validity period. The mobile device 303 sends the purchase information to the ticket controller 302 (at 312). The ticket controller 302 assigns a user ticket identifier (at 313). The ticket controller sends the user ticket identifier to the mobile device 303 (at 314). The ticket controller also sends the user ticket identifier and biometric data to the ticket database 301 (at 315). The ticket controller may also send the validity period to the ticket database 301 (at 315).

At usage time 320, the ticket controller 302 sends a broadcast inquiry frame, as discussed above, to the mobile device 303 (at 321). The mobile device 303 obtains biometric data from the user 304. The mobile device 303 sends 323 an inquiry response frame, as discussed above, to the ticket controller 302, containing the ticket identifier and the biometric data of the user. The ticket controller 302 also obtains, from the ticket database 301, a plurality of stored ticket identifiers corresponding stored biometric data (at 324). The ticket controller obtains a current or usage time (at 325). The ticket controller checks for a match 326 by comparing the user's ticket identifier to the plurality of stored ticket identifiers, and comparing the corresponding stored biometric data to the user biometric data. If the ticket controller 302 identifies a match and the current or usage time is within the validity period, the user 304 will be validated (at 327) as an authorized user. If the ticket controller 302 does not find a match, or the current time is outside of the validity period, the user 304 will not be validated (at 328).

Figure 4:
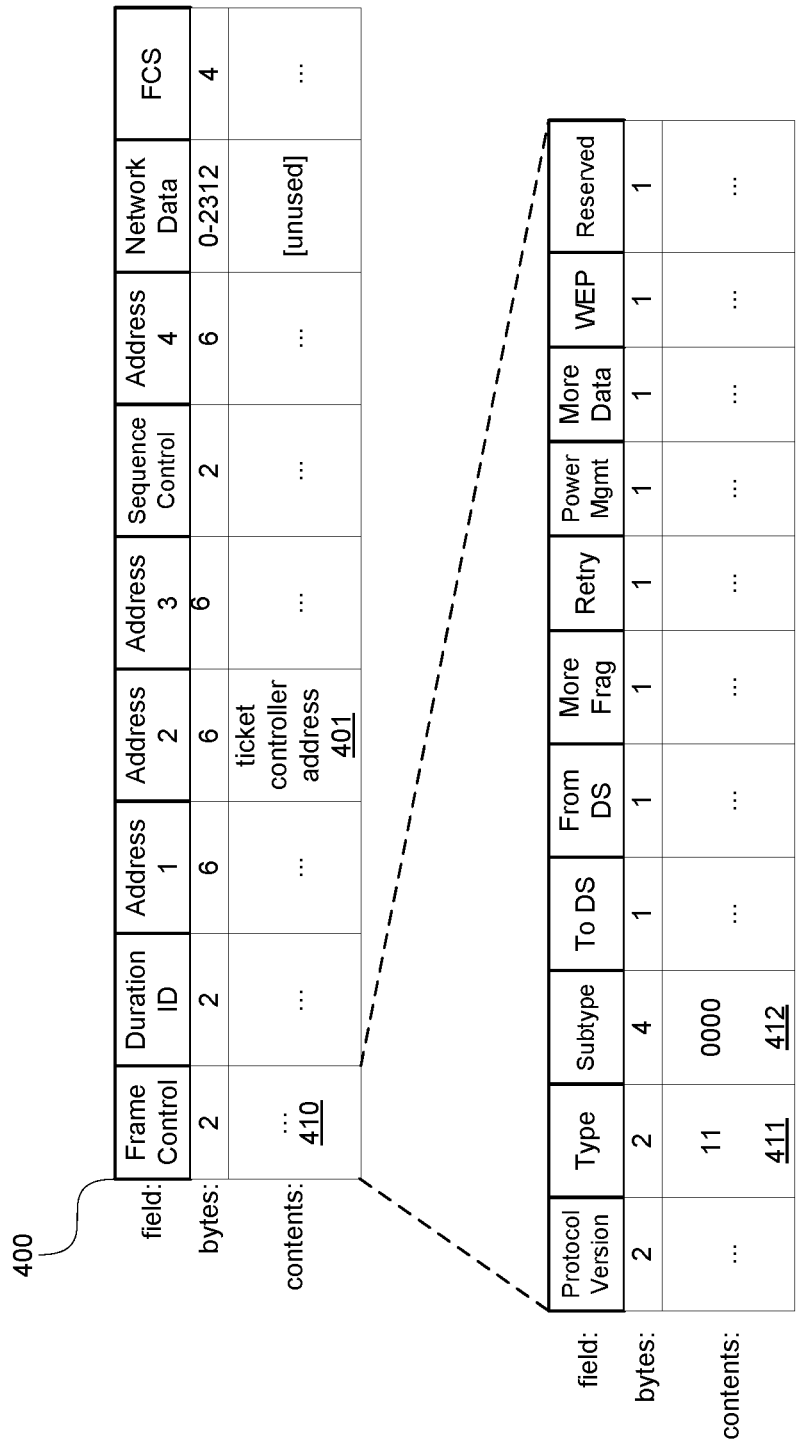
FIG. 4 illustrates an example of the broadcast inquiry frame, according to one embodiment.

FIG. 4 illustrates an example broadcast inquiry frame 400, according to one embodiment. The broadcast inquiry acts as a request for inquiry response frames. For example, a user attempting to submit a ticket to the ticket controller device 130 may trigger the ticket controller device to generate the broadcast inquiry frame 400. As shown, the broadcast inquiry is an IEEE 802.11 frame 400 with a frame control block 410. In this example, the IEEE 802.11 frame may identify as a broadcast inquiry through the type field 411 of the frame control block 410.

Typically, in the IEEE 802.11 standard, the type field 411 does not have a meaning assigned to binary value "11." In this example, when a mobile device 110 receives an IEEE 802.11 frame with the type field in the frame header set to "11," the mobile device 110 interprets the frame as a broadcast inquiry. Of course, one of skill in the art will appreciate that other unused fields in the frame can be adapted to identify the frame as a broadcast inquiry. Additionally, the subtype field 412 may be set to some specified value to further identify the broadcast inquiry. The Address 2 field 401 may specify the address of the ticket controller.

Of course, the broadcast inquiry frame may be generated using another communications protocol. For example, the broadcast inquiry may be a Bluetooth (IEEE 802.15.4) frame, or the broadcast inquiry may be communicated via near-field communications. Further still, the broadcast inquiry frame could be communicated optically, such as via a QR code.

Figure 5:
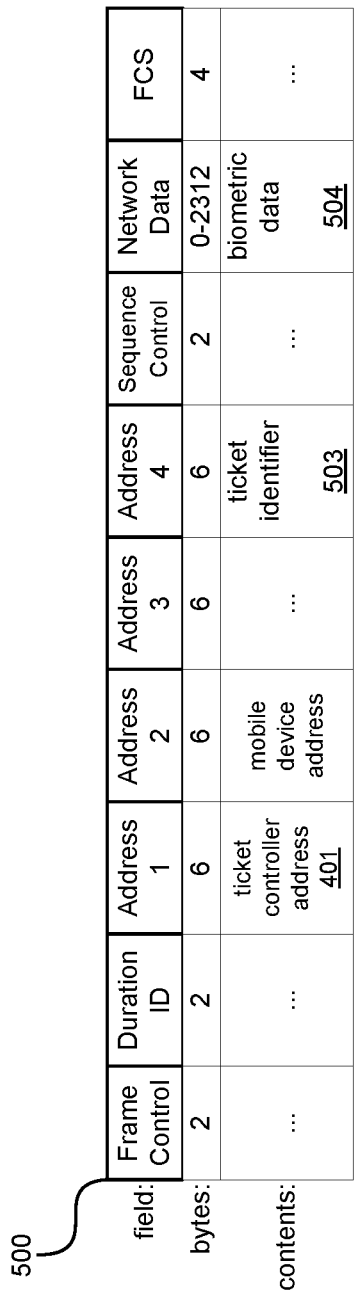
FIG. 5 illustrates an example of the inquiry response frame, according to one embodiment.

FIG. 5 illustrates an example of the inquiry response 500, according to one embodiment. As stated, the inquiry response is generated by the mobile device 110 in response to a broadcast inquiry, and specifies a ticket identifier and biometric data of the user as part of the biometric verification process. As shown, the inquiry response is a standard IEEE 802.11 frame. In this example, the "Address 4" field 503 specifies the ticket identifier. The "Network Data" field 504 specifies the biometric data of the user. Continuing the previous example, the "Address 1" field of the response 500 can include the ticket controller address of the broadcast frame (e.g., the ticket controller address provided in address 2 field 401). Further, the "Address 2" field may specify the mobile address of the transmitter.

Figure 6:
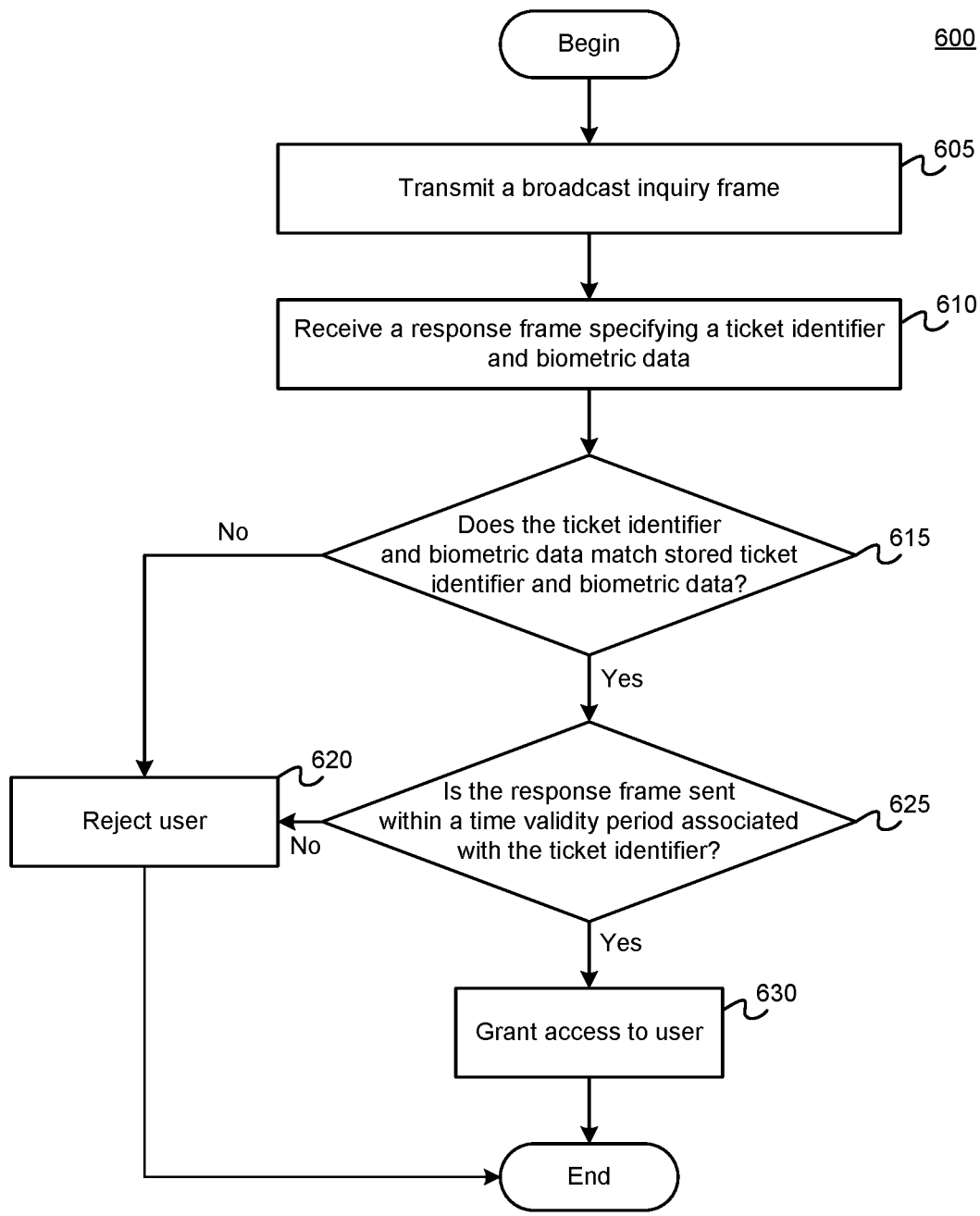
FIG. 6 illustrates a method for validating a ticket, according to one embodiment.

FIG. 6 illustrates a method 600 for validating a ticket, according to one embodiment. For example, the ticket controller device 130 may initiate method 600 when a user attempts to use a ticket to access a public infrastructure. As shown, method 600 begins at step 605, where the ticket controller device 130 generates and sends a broadcast inquiry frame. In turn, a mobile device of the user may generate a response frame to the inquiry. At step 610, the ticket controller device 130 receives a response frame which specifies a ticket identifier and biometric data.

At step 615, the ticket controller device 130 determines whether the ticket identifier and the biometric data match a ticket identifier and biometric data pair in the ticket database 120. To do so, the ticket controller device 130 may query the ticket database 120 using the ticket identifier as part of the query. Once identified, the ticket controller device 130 may evaluate the biometric data associated with the ticket identifier retrieved from the database 120. For example, the ticket controller device 130 may do so using pattern matching techniques (e.g., in the event that the biometric data corresponds to fingerprint data), voice recognition techniques (e.g., for biometric data corresponding to the voice of a user), and the like.

In the event that the ticket controller device 130 is unable to identify a matching ticket identifier in the database 120, or if the ticket controller device 130 is unable to match the biometric data, then, at step 620, the ticket controller device 130 rejects the user. For instance, the ticket controller device 130 may request toll from the user, or direct the mobile device 110 to prompt the user for further authentication (e.g., to re-submit biometric data on the mobile device 110, etc.).

If the ticket controller device 130 finds a match, then at step 625, the ticket controller device 130 determines whether the response frame is sent within a specified validity period associated with the ticket identifier. To identify the specified validity period, the ticket controller device 130 may retrieve information associated with the ticket identifier that is stored in the ticket database 120. In one embodiment, the ticket controller device 130 may also determine whether the response frame is sent within a specified location associated with the ticket identifier. If the ticket controller device 130 determines that the response frame is outside of a validity period (or outside of a valid location), then the ticket controller device 130 may reject the user (at step 620). Otherwise, at step 625, the ticket controller device 130 grants access to the user.

Figure 7:
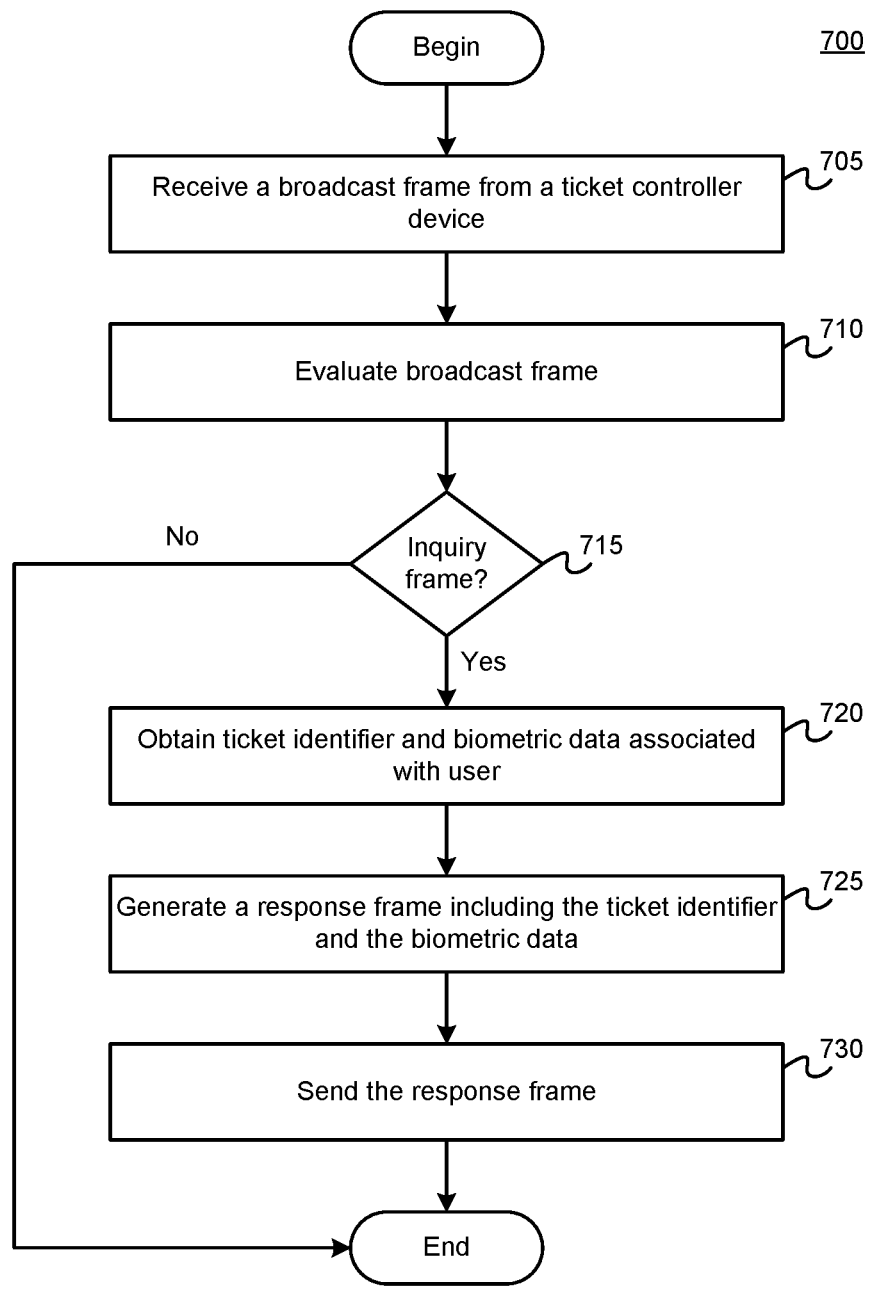
FIG. 7 illustrates a method for responding to a broadcast inquiry by a ticket controller device, according to one embodiment.

FIG. 7 illustrates a method 700 for responding to a broadcast inquiry by a ticket controller device, according to one embodiment. As shown, method 700 begins at step 705, where the mobile device 110 receives a broadcast frame from the ticket controller device 130. At step 710, the authorization software 112 evaluates the broadcast frame to identify whether a type field indicates that the frame is an inquiry frame (at step 715), if not, then the method 700 ends.

Otherwise, at step 720, the authorization software 112 obtains the ticket identifier 113 and biometric data associated with the user. For example, the authorization software 112 may direct the input sensors 111 to capture some form of biometric data used to register the ticket, e.g., by fingerprint scanning, voice recognition, and the like. At step 725, the authorization software 112 generates a response frame for the ticket controller 130. In particular, the authorization software 112 encapsulates the ticket identifier and biometric data in the frame. At step 730, the authorization software 112 transmits the response frame to the ticket controller device 130.

Figure 8:
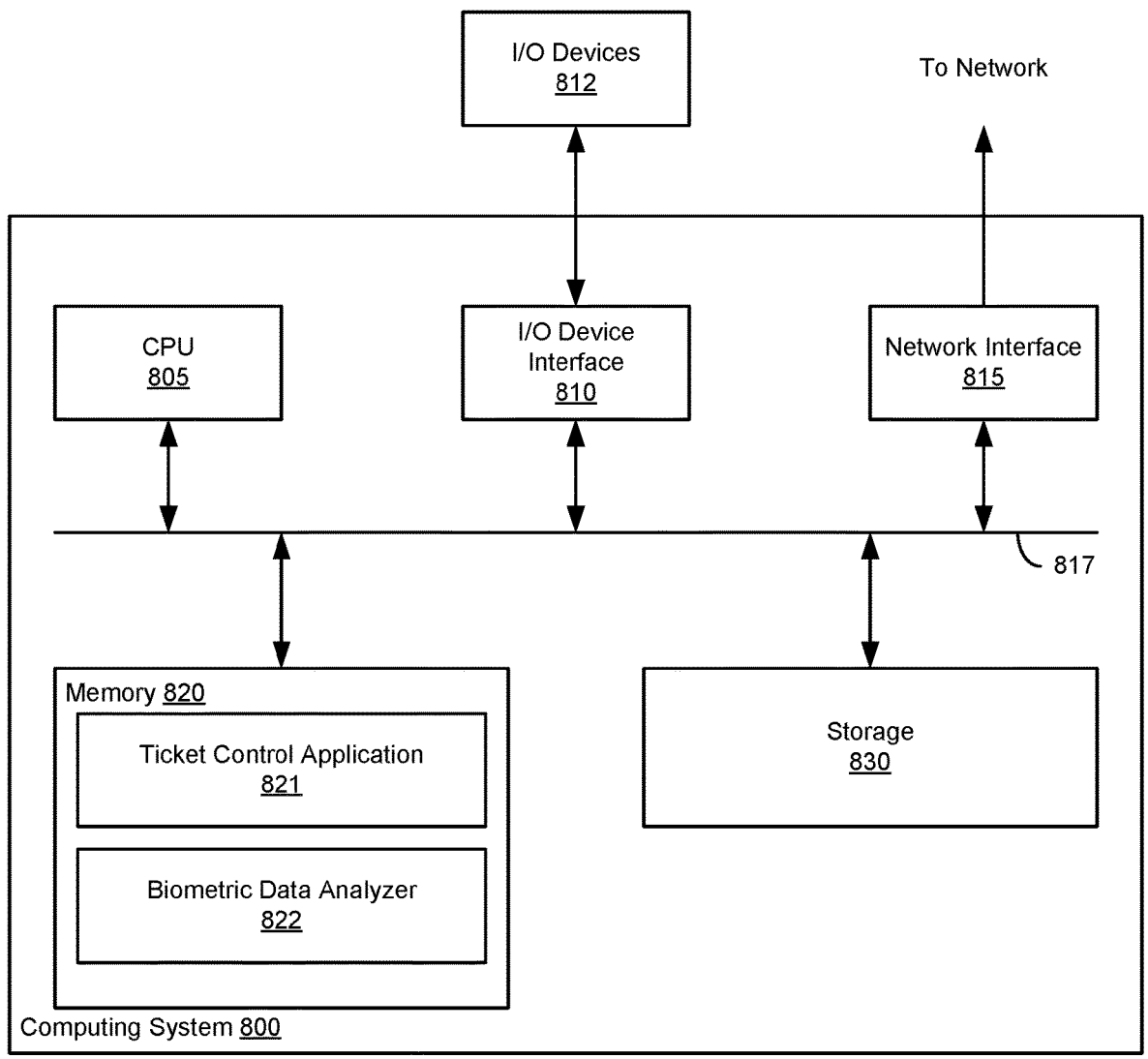
FIG. 8 illustrates an example computing system configured to verify biometric data associated with a ticket user, according to one embodiment.

FIG. 8 illustrates an example computing system 800 configured to validate a ticket using biometric data, according to one embodiment. In one embodiment, the computing system 800 corresponds to the ticket controller discussed above. As shown, the computing system 800 includes, without limitation, a central processing unit (CPU) 805, a network interface 815, a memory 820, and storage 830, each connected to a bus 817. The computing system 800 may also include an I/O device interface 810 connecting I/O devices 812 (e.g., keyboard, display, mouse devices, etc.) to the computing system 800. Further, in context of the present disclosure, the computing elements shown in the computing system 800 may correspond to a physical computing system (e.g., a system in an enterprise network) or a virtual computing instance.

CPU 805 retrieves and executes programming instructions stored in memory 820 as well as stores and retrieves application data residing in the storage 830. The bus 817 is used to transmit programming instructions and application data between CPU 805, I/O devices interface 810, storage 830, network interface 815, and memory 820. Note, CPU 805 is included to be representative of a single CPU, multiple CPUs, a single CPU having multiple processing cores, and the like. Memory 820 is generally included to be representative of a random access memory. Storage 830 may be a disk drive storage device. Although shown as a single unit, storage 830 may be a combination of fixed and/or removable storage devices, such as fixed disc drives, removable memory cards, or optical storage, network attached storage (NAS), or a storage area-network (SAN).

Illustratively, memory 820 includes a ticket control application 821 and a biometric data analyzer 822. In one embodiment, the ticket control application 821 may generate broadcast inquiry frames requesting ticket identifier and biometric data information from a user, e.g., a ticket holder attempting to access a public infrastructure. The ticket control application 821 may receive a response frame to the broadcast inquiry frame from, e.g., a mobile device. The response frame may include a ticket identifier and biometric data information associated with the user. The ticket control application 821 may then determine whether the ticket identifier and the biometric data match with a corresponding ticket identifier and biometric data stored in a ticket database. Further, if the ticket control application 821 identifies a match, the ticket control application 821 may retrieve additional ticket information associated with the ticket identifier to determine whether the ticket is within a specified validity period and/or location. The ticket controller application 821 may validate the ticket based on the information and grant the user access to the public infrastructure.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

In the following, reference is made to embodiments presented in this disclosure. However, the scope of the present disclosure is not limited to specific described embodiments. Instead, any combination of the following features and elements, whether related to different embodiments or not, is contemplated to implement and practice contemplated embodiments. Furthermore, although embodiments disclosed herein may achieve advantages over other possible solutions or over the prior art, whether or not a particular advantage is achieved by a given embodiment is not limiting of the scope of the present disclosure. Thus, the following aspects, features, embodiments and advantages are merely illustrative and are not considered elements or limitations of the appended claims except where explicitly recited in a claim(s). Likewise, reference to "the invention" shall not be construed as a generalization of any inventive subject matter disclosed herein and shall not be considered to be an element or limitation of the appended claims except where explicitly recited in a claim(s).

Aspects of the present invention may take the form of an entirely hardware embodiment, an entirely software embodiment (including firmware, resident software, microcode, etc.) or an embodiment combining software and hardware aspects that may all generally be referred to herein as a "circuit," "module" or "system."

The present disclosure may be a system, a method, and/or a computer program product. The computer program product may include a computer readable storage medium (or media) having computer readable program instructions thereon for causing a processor to carry out aspects of the present disclosure.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present disclosure may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present disclosure.

Aspects of the present disclosure are described herein with reference to flowchart illustrations and/or block diagrams of methods, apparatus (systems), and computer program products according to embodiments of the present disclosure. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present disclosure. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions. While the foregoing is directed to embodiments of the present invention, other and further embodiments of the invention may be devised without departing from the basic scope thereof, and the scope thereof is determined by the claims that follow.

What is claimed is:

1. A computer-implemented method to verify ticket ownership and validity, based on biometric data, the computer-implemented method comprising:

broadcasting a first frame wirelessly by a ticket controller configured to interact with multiple ticket users at a time, the multiple ticket users responding to the broadcasting, wherein the first frame specifies a request for a first ticket identifier and first biometric data each associated with a ticket user requesting access to a physical service hosted by the ticket controller, wherein the ticket controller is part of a distributed system, wherein the ticket controller is operatively connected to a biometric data analyzer, wherein the ticket controller and the biometric data analyzer comprise distinct applications executing on a ticket controller device separate from a mobile device of the ticket user, wherein the first frame comprises a first IEEE 802.11 frame of a predefined format, wherein the first frame comprises a first frame header with a type field set to a specified value indicating that the IEEE 802.11 frame is a broadcast inquiry;

receiving, from the mobile device, a second frame sent wirelessly in response to the first frame, wherein the second frame was generated by an authorization application executing on the mobile device, wherein the ticket controller is operatively connected to the ticket controller via a network, wherein the second frame includes the first biometric data associated with the ticket user, wherein the mobile device comprises a plurality of input sensors including a microphone, a camera, a touch sensor, and a fingerprint scanner, wherein the mobile device obtains the first biometric data at a first point in time and encapsulates the first biometric data in the second frame, wherein the first biometric data in the second frame is encrypted or compressed, wherein the second frame comprises a second IEEE 802.11 frame of the predefined format, the second frame comprising a second frame header with a plurality of address fields, wherein one of the plurality of address fields specifies the first ticket identifier; and upon determining, by operation of one or more computer processors and based on an evaluation by the biometric data analyzer, that the first ticket identifier and the first biometric data match a corresponding second ticket identifier and a second biometric data obtained by the mobile device at a second point in time subsequent to the first point in time, granting the ticket user access to the physical service, including causing the physical service to become accessible by the ticket user, wherein the access granted to the physical service is limited to a specified validity period and a specified physical location associated with the first ticket identifier, wherein ticket ownership and validity is verified based on biometric data, wherein an indication of the granted access is output, wherein the access comprises physical access;

wherein the physical service is successfully accessed by the ticket user after the access to the physical service is granted, wherein the second ticket identifier and second biometric data are of a plurality of ticket identifiers and biometric data stored in a ticket database operatively connected to the ticket controller via the network;

wherein the ticket controller is configured to provide scalability with a number of ticket users with which the ticket controller is interacting at a time, at least relative to an absence of any ticket controller configured to interact with multiple ticket users at a time;

wherein the ticket controller is further configured to revoke the first ticket identifier upon determining that a count of uses of the first ticket identifier by the ticket user has met a predefined threshold count;

wherein the ticket controller is further configured to, upon determining that the first ticket identifier and the first biometric data do not match any corresponding second ticket identifier and second biometric data, prevent the ticket user from accessing the physical service;

wherein each of the first and second biometric data is obtained by the authorization program by: scanning a respective fingerprint of the ticket user by the mobile device, recording a respective voice of the ticket user by the mobile device, obtaining a respective digital signature of the ticket user via the mobile device, and capturing a respective facial image of the ticket user via the mobile device;

wherein the ticket user comprises a first ticket user, wherein the ticket controller is further configured to prevent transferred use of non-transferrable tickets, by: upon determining that the first ticket identifier and a third biometric data of a second ticket user, different from the first ticket user, do not match any corresponding ticket identifier and biometric data in the ticket database, preventing the second ticket user from accessing the physical service, including causing the physical service to remain inaccessible by the second ticket user, wherein an indication of the access being denied is output;

wherein the predefined format includes a frame control field of two bytes, a duration identifier of two bytes, four address fields each of six bytes, a sequence control field of two bytes, a network data field, and a frame check sequence field of four bytes, wherein the plurality of address fields includes the four address fields;

wherein the frame control field of two bytes in turn includes a protocol version field of two bits, a type field of two bits, a subtype field of four bits, a to-distribution-system bit, a from-distribution-system bit, a more-fragments bit, a retry bit, a power management bit, a more-data bit, a wired equivalent privacy (WEP) bit, and a reserved bit;

wherein the physical service comprises, in respective instances: public transit, a musical event, a sporting event, a fitness facility, a recreational facility, and an entertainment venue.

2. A computer program product to verify ticket ownership and validity, based on biometric data, the computer program product comprising:

a non-transitory computer-readable storage medium having computer-readable program code of a ticket controller, the computer-readable program code executable by one or more computer processors to perform an operation comprising:

broadcasting a first frame wirelessly by the ticket controller, which is configured to interact with multiple ticket users at a time, the multiple ticket users responding to the broadcasting, wherein the first frame specifies a request for a first ticket identifier and first biometric data each associated with a ticket user requesting access to a physical service hosted by the ticket controller, wherein the ticket controller is part of a distributed system, wherein the ticket controller is operatively connected to a biometric data analyzer, wherein the ticket controller and the biometric data analyzer comprise distinct applications executing on a ticket controller device separate from a mobile device of the ticket user, wherein the first frame comprises a first IEEE 802.11 frame of a predefined format, wherein the first frame comprises a first frame header with a type field set to a specified value indicating that the IEEE 802.11 frame is a broadcast inquiry:

receiving, from the mobile device, a second frame sent wirelessly in response to the first frame, wherein the second frame was generated by an authorization application executing on the mobile device, wherein the ticket controller is operatively connected to the authorization application via a network, wherein the second frame includes and the first biometric data associated with the ticket user, wherein the mobile device comprises a plurality of input sensors including a microphone, a camera, a touch sensor, and a fingerprint scanner, wherein the mobile device obtains the first biometric data at a first point in time and encapsulates the first biometric data in the second frame, wherein the first biometric data in the second frame is encrypted or compressed, wherein the second frame comprises a second IEEE 802.11 frame of the predefined format, the second frame comprising a second frame header with a plurality of address fields, wherein one of the plurality of address fields specifies the first ticket identifier; and upon determining, based on an evaluation by the biometric data analyzer, that the first ticket identifier and the first biometric data match a corresponding second ticket identifier and a second biometric data obtained by the mobile device at a second point in time subsequent to the first point in time, granting the ticket user access to the physical service, including causing the physical service to become accessible by the ticket user, wherein the access granted to the physical service is limited to at least one of a specified validity period and a specified physical location associated with the first ticket identifier, wherein ticket ownership and validity is verified based on biometric data, wherein an indication of the granted access is output, wherein the access comprises physical access;

wherein the physical service is successfully accessed by the ticket user after the access to the physical service is granted, wherein the second ticket identifier and second biometric data are of a plurality of ticket identifiers and biometric data stored in a ticket database operatively connected to the ticket controller via the network, wherein the ticket controller is configured to provide scalability with a number of ticket users with which the ticket controller is interacting at a time, at least relative to an absence of any ticket controller configured to interact with multiple ticket users at a time;

wherein the ticket controller is further configured to revoke the first ticket identifier upon determining that a count of uses of the first ticket identifier by the ticket user has met a predefined threshold count;

wherein the ticket controller is further configured to, upon determining that the first ticket identifier and the first biometric data do not match any corresponding second ticket identifier and second biometric data, prevent the ticket user from accessing the physical service;

wherein each of the first and second biometric data is obtained by the authorization program by: scanning a respective fingerprint of the ticket user by the mobile device, recording a respective voice of the ticket user by the mobile device, obtaining a respective digital signature of the ticket user via the mobile device, and capturing a respective facial image of the ticket user via the mobile device;

wherein the ticket user comprises a first ticket user, wherein the ticket controller is further configured to prevent transferred use of non-transferrable tickets, by: upon determining that the first ticket identifier and a third biometric data of a second ticket user, different from the first ticket user, do not match any corresponding ticket identifier and biometric data in the ticket database, preventing the second ticket user from accessing the physical service, including causing the physical service to remain inaccessible by the second ticket user, wherein an indication of the access being denied is output;

wherein the predefined format includes a frame control field of two bytes, a duration identifier of two bytes, four address fields each of six bytes, a sequence control field of two bytes, a network data field, and a frame check sequence field of four bytes, wherein the plurality of address fields includes the four address fields;

wherein the frame control field of two bytes in turn includes a protocol version field of two bits, a type field of two bits, a subtype field of four bits, a to-distribution-system bit, a from-distribution-system bit, a more-fragments bit, a retry bit, a power management bit, a more-data bit, a wired equivalent privacy (WEP) bit, and a reserved bit;

wherein the physical service comprises one of: public transit, a musical event, a sporting event, a fitness facility, a recreational facility, and an entertainment venue.

3. A system to verify ticket ownership and validity, based on biometric data, the system comprising:

one or more computer processors; and a memory hosting an application comprising a ticket controller, which, when executed on the one or more computer processors, performs an operation comprising:

broadcasting a first frame wirelessly by the ticket controller, which is configured to interact with multiple ticket users at a time, the multiple ticket users responding to the broadcasting, wherein the first frame specifies a request for a first ticket identifier and first biometric data each associated with a ticket user requesting access to a physical service hosted by the ticket controller, wherein the ticket controller is part of a distributed system, wherein the ticket controller is operatively connected to a biometric data analyzer, wherein the ticket controller and the biometric data analyzer comprise distinct applications executing on a ticket controller device separate from a mobile device of the ticket user, wherein the first frame comprises a first IEEE 802.11 frame of a predefined format, wherein the first frame comprises a first frame header with a type field set to a specified value indicating that the IEEE 802.11 frame is a broadcast inquiry;

receiving, from the mobile device, a second frame sent wirelessly in response to the first frame, wherein the second frame was generated by an authorization application executing on the mobile device, wherein the ticket controller is operatively connected to the authorization application via a network, wherein the second frame includes the first biometric data associated with the ticket user, wherein the mobile device comprises a plurality of input sensors including from a microphone, a camera, a touch sensor, and a fingerprint scanner, wherein the mobile device obtains the first biometric data at a first point in time and encapsulates the first biometric data in the second frame, wherein the first biometric data in the second frame is encrypted or compressed, wherein the second frame comprises a second IEEE 802.11 frame of the predefined format, the second frame comprising a second frame header with a plurality of address fields, wherein one of the plurality of address fields specifies the first ticket identifier; and upon determining, based on an evaluation by the biometric data analyzer, that the first ticket identifier and the first biometric data match a corresponding second ticket identifier and a second biometric data obtained by the mobile device at a second point in time subsequent to the first point in time, granting the ticket user access to the physical service, including causing the physical service to become accessible by the ticket user, wherein the access granted to the physical service is limited to a specified validity period and a specified physical location associated with the first ticket identifier, wherein ticket ownership and validity is verified based on biometric data, wherein an indication of the granted access is output, wherein the access comprises physical access;

wherein the physical service is successfully accessed by the ticket user after the access to the physical service is granted, wherein the second ticket identifier and second biometric data are of a plurality of ticket identifiers and biometric data stored in a ticket database operatively connected to the ticket controller via the network;

wherein the ticket controller is configured to provide scalability with a number of ticket users with which the ticket controller is interacting at a time, at least relative to an absence of any ticket controller configured to interact with multiple ticket users at a time;

wherein the ticket controller is further configured to revoke the first ticket identifier upon determining that a count of uses of the first ticket identifier by the ticket user has met a predefined threshold count;

wherein the ticket controller is further configured to, upon determining that the first ticket identifier and the first biometric data do not match any corresponding second ticket identifier and second biometric data, prevent the ticket user from accessing the physical service;

wherein each of the first and second biometric data is obtained by the authorization program by: scanning a respective fingerprint of the ticket user by the mobile device, recording a respective voice of the ticket user by the mobile device, obtaining a respective digital signature of the ticket user via the mobile device, and capturing a respective facial image of the ticket user via the mobile device;

wherein the ticket user comprises a first ticket user, wherein the ticket controller is further configured to prevent transferred use of non-transferrable tickets, by: upon determining that the first ticket identifier and a third biometric data of a second ticket user, different from the first ticket user, do not match any corresponding ticket identifier and biometric data in the ticket database, preventing the second ticket user from accessing the physical service, including causing the physical service to remain inaccessible by the second ticket user, wherein an indication of the access being denied is output;

wherein the predefined format includes a frame control field of two bytes, a duration identifier of two bytes, four address fields each of six bytes, a sequence control field of two bytes, a network data field, and a frame check sequence field of four bytes, wherein the plurality of address fields includes the four address fields;

wherein the frame control field of two bytes in turn includes a protocol version field of two bits, a type field of two bits, a subtype field of four bits, a to-distribution-system bit, a from-distribution-system bit, a more-fragments bit, a retry bit, a power management bit, a more-data bit, a wired equivalent privacy (WEP) bit, and a reserved bit;

wherein the physical service comprises, in respective instances: public transit, a musical event, a sporting event, a fitness facility, a recreational facility, and an entertainment venue.

* * * * *